(12) United States Patent
Duller

(10) Patent No.: US 7,762,621 B2
(45) Date of Patent: Jul. 27, 2010

(54) THIRD ROW SEAT FOR TRUCK CABIN

(75) Inventor: Bernardo M. Duller, Troy, MI (US)

(73) Assignee: Chrysler Group LLP, Auburn Hills, MI (US)

( * ) Notice: Subject to any disclaimer, the term of this patent is extended or adjusted under 35 U.S.C. 154(b) by 530 days.

(21) Appl. No.: 11/763,706

(22) Filed: Jun. 15, 2007

(65) Prior Publication Data

US 2008/0309112 A1    Dec. 18, 2008

(51) Int. Cl.
B60N 2/01    (2006.01)

(52) U.S. Cl. .................................. 296/190.11

(58) Field of Classification Search ............ 296/190.11, 296/37.14, 51, 106, 63, 64, 65.01, 66, 67, 296/68, 68.1, 146.1, 10; 297/14, 15, 331, 297/335, 336, 337, 341
See application file for complete search history.

(56) References Cited

U.S. PATENT DOCUMENTS

| | | | | |
|---|---|---|---|---|
| 3,169,792 | A | * | 2/1965 | Solano Viquez ........... 296/99.1 |
| 4,480,868 | A | * | 11/1984 | Koto ..................... 296/190.11 |
| 5,826,906 | A | | 10/1998 | Drop, Sr. |
| 6,398,291 | B1 | * | 6/2002 | Reusswig et al. ........ 296/186.4 |
| 6,478,355 | B1 | * | 11/2002 | Van Eden et al. .......... 296/37.6 |
| 6,513,863 | B1 | * | 2/2003 | Renke et al. ........... 296/190.11 |
| 6,742,834 | B1 | * | 6/2004 | Merritt et al. .......... 296/190.11 |
| 6,786,535 | B1 | * | 9/2004 | Grzegorzewski et al. ..................... 296/190.11 |
| 6,851,741 | B1 | * | 2/2005 | Burg ..................... 296/190.11 |
| 6,899,367 | B1 | * | 5/2005 | Plavetich et al. ......... 296/65.13 |
| 6,929,301 | B2 | | 8/2005 | Kim et al. |
| 6,959,960 | B2 | * | 11/2005 | Buccinna et al. ....... 296/190.11 |

FOREIGN PATENT DOCUMENTS

JP    58030877 A    *    2/1983

* cited by examiner

*Primary Examiner*—H Gutman
(74) *Attorney, Agent, or Firm*—Ralph E. Smith

(57) ABSTRACT

A vehicle includes a cabin and a bed. A first row seat and a second row seat are provided in the cabin, and a dividing wall separates the cabin and the bed. A third-row seat is mounted to the dividing wall, and the dividing wall is pivotable to deploy the third-row seat from a stowed position in the cabin to a deployed position in the bed.

19 Claims, 11 Drawing Sheets

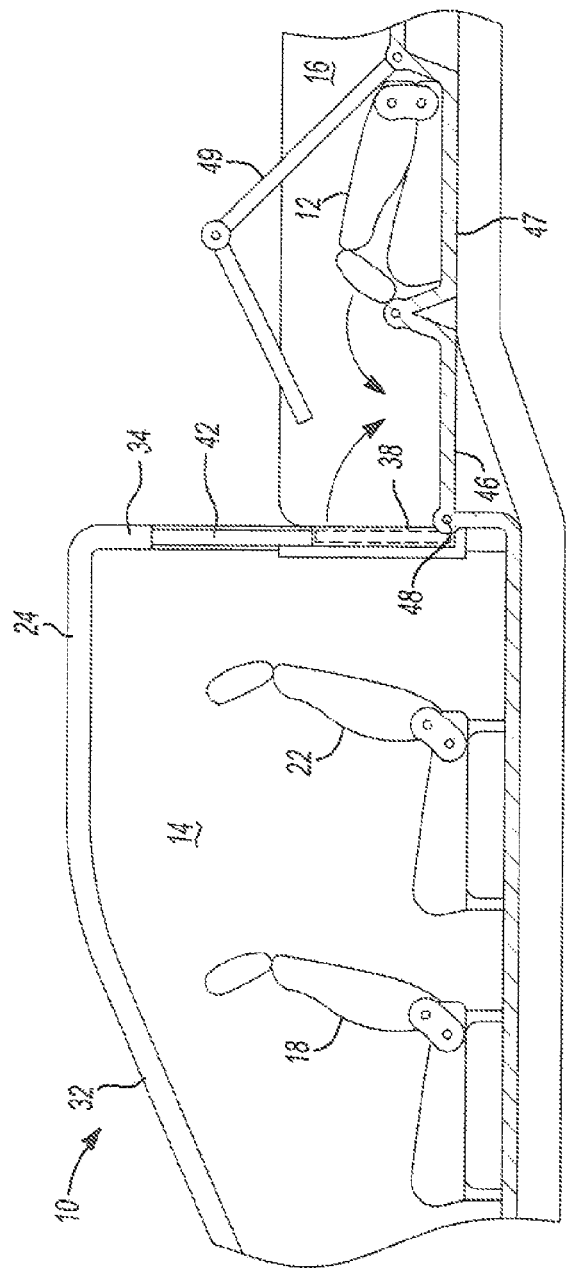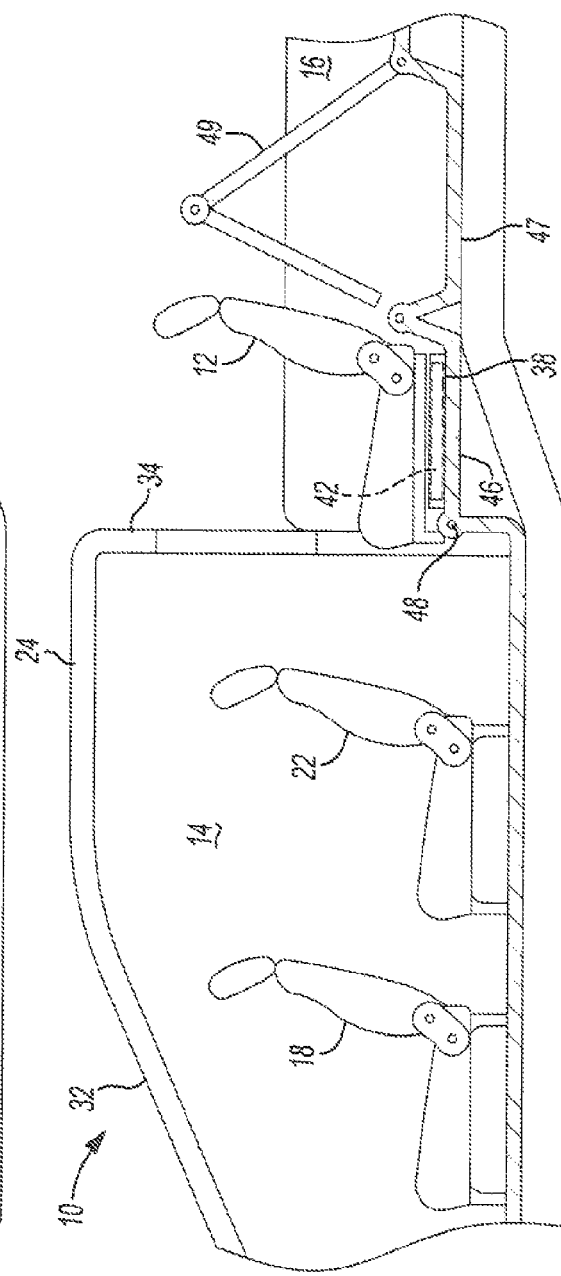

THIRD ROW SEAT FOR TRUCK CABIN

FIELD

The present disclosure relates to a third-row seat for a motor vehicle.

BACKGROUND

Different vehicles have been developed to accommodate specific types of uses. For example, a work vehicle may be designed as a truck including a large cargo bed, easily accessible from the outside of the vehicle. Similarly, a family vehicle may be designed as a minivan that is large enough to carry more than five passengers, yet still able to accommodate a reasonable amount of cargo. More recently, vehicles such as sport utility vehicles (SUV's) that combine the beneficial aspects of both a truck and minivan have become prevalent. An SUV, however, although combining the beneficial aspects of a truck and a minivan, may not provide some consumers with enough versatility or functionality to suit their needs.

SUMMARY

A vehicle includes a cabin and a bed. A first row seat and a second row seat are provided in the cabin, and a dividing wall separates the cabin and the bed. A third-row seat is mounted to the dividing wall, and the dividing wall is pivotable to deploy the third-row seat from a stowed position in the cabin to a deployed position in the bed.

Further areas of applicability of the present disclosure will become apparent from the detailed description provided hereinafter. It should be understood that the detailed description and specific examples are intended for purposes of illustration only and are not intended to limit the scope of the present disclosure.

DRAWINGS

The present disclosure will become more fully understood from the detailed description and the accompanying drawings, wherein:

FIG. 8 is a cross-sectional view of a motor vehicle including a third row seat according to the present disclosure in an un-deployed state;

FIG. 9 is a cross-sectional view of a motor vehicle including a third row seat according to the present disclosure in a deployed state;

DETAILED DESCRIPTION OF THE PREFERRED EMBODIMENTS

The following description is merely exemplary in nature and is in no way intended to limit the present disclosure, its application, or uses.

Figure 1:
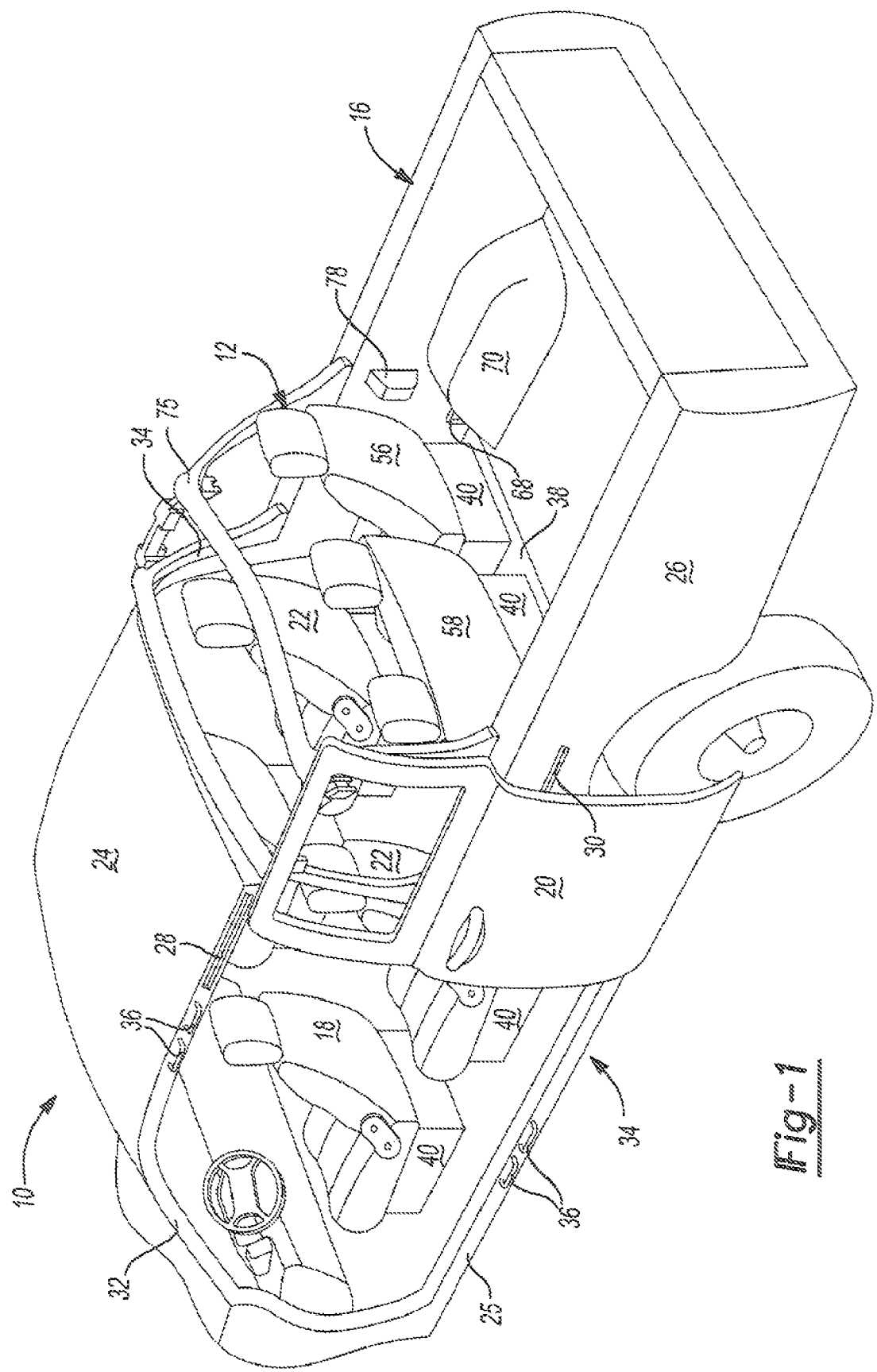
FIG. 1 is a perspective view of a motor vehicle including a third row seat according to the present disclosure.

In FIG. 1, a motor vehicle 10 is illustrated including a third-row seat 12. The motor vehicle 10 may be a pick-up truck including a cabin 14 and a bed 16. To access the cabin 14, doors are provided on either side of the vehicle 10. A front door (not shown) provides access to the front driver and passenger seats 18. A rear door 20 provides access to a second-row seat 22, as well as access to the third-row seat 12.

The rear door 20 may be a sliding door similar to that used on a van or mini-van vehicle. To accommodate the sliding door 20, the roof 24 and rear panels 26 of the motor vehicle 10 may be provided with tracks 28 and 30 that guide door 20 as it slides to an open position. The B-pillar may also be removed to provide easier access to the rear of the vehicle cabin 14. Alternatively, however, the vehicle 10 may include a B-pillar.

If the B-pillar is omitted, however, the A- and C-pillars 32 and 34, respectively, may be reinforced to provide proper structural support for the roof. Alternatively, rear door 20 may be provided with increased structural integrity to accommodate for the lack of a B-pillar. In this regard, the frame of the door may be provided with a reinforcing beam along a length of door that increases the structural rigidity of the door. Such a beam may function as a B-pillar. Regardless, when the B-pillar is omitted, hooks or latches 36 may be provided at the roof 24 and floor 25 of the vehicle 10 cab. Hooks 36 may be used to secure front door and rear door 20 when the doors are in a closed position.

Although vehicle 10 is illustrated as including a sliding rear door 20, it should be understood that vehicle 10 may be provided with a rear door similar to the front door. That is, vehicle 10 may be provided with a rear door that pivots relative to the cabin 14 without departing from the spirit and scope of the present teachings.

Figure 2:
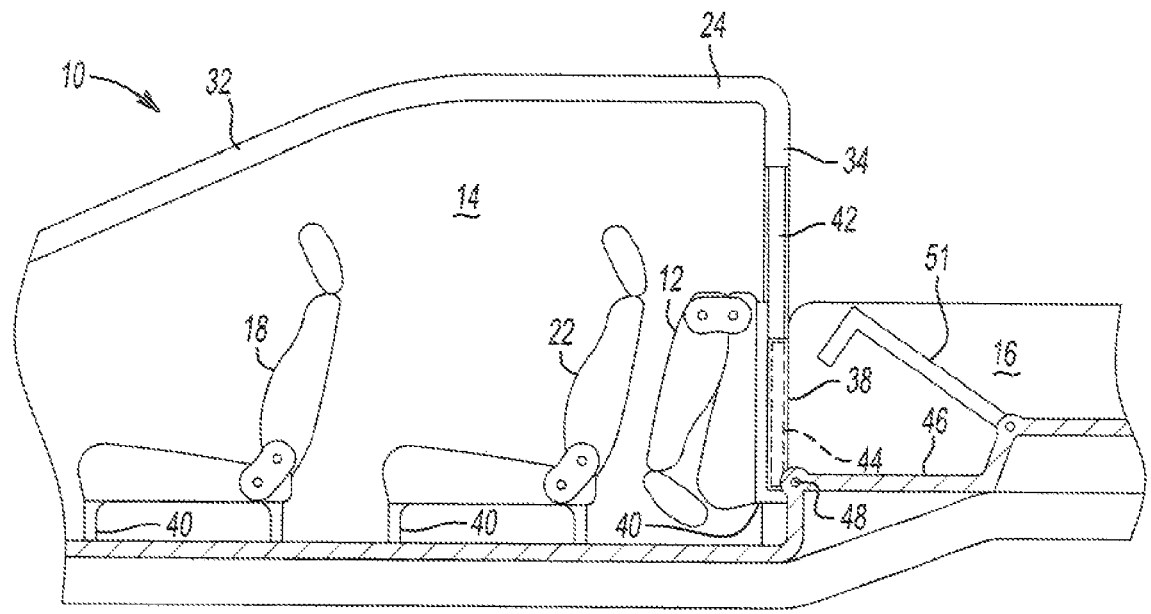
FIG. 2 is a cross-sectional view of a motor vehicle including a third row seat according to the present disclosure in an un-deployed state.
Figure 3:
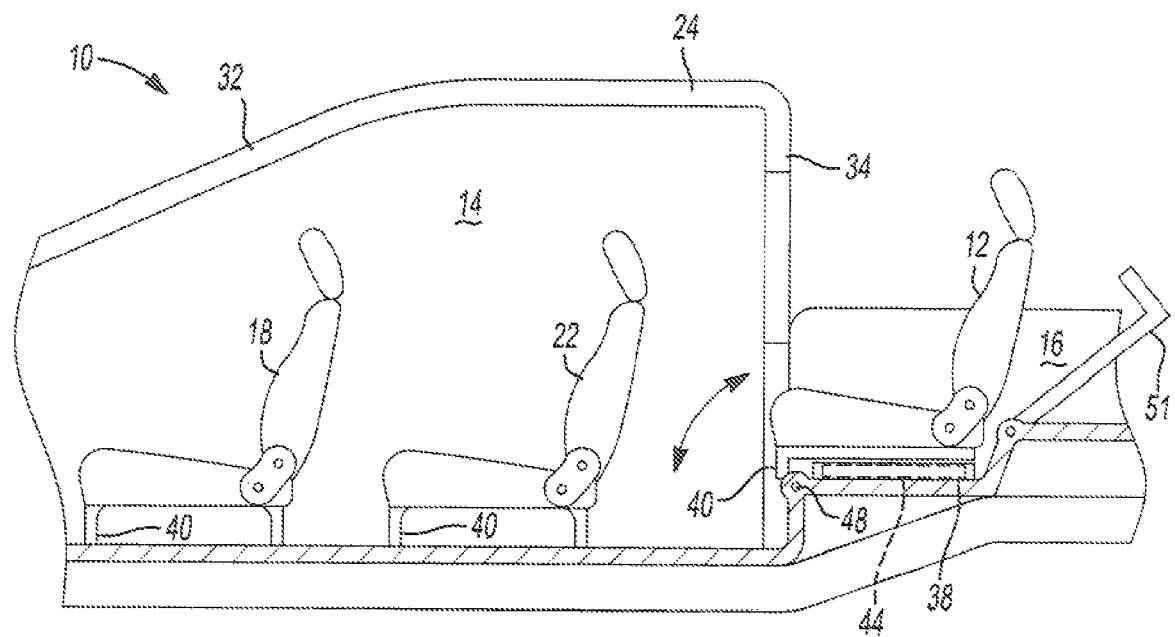
FIG. 3 is a cross-sectional view of a motor vehicle including a third row seat according to the present disclosure in a deployed state.

Now referring to FIGS. 2 and 3, the third-row seat 12, in an un-deployed state, may be disposed in cabin 14 of motor vehicle 10. Third-row seat 12 may be mounted to a dividing wall 38 that separates cabin 14 from bed 16 of motor vehicle 10. In this regard, third-row seat 12 may be folded in a manner such that when seat 12 is in a stowed position (i.e, when dividing wall 38 is in an upright position), seat 12 folds to fit neatly behind second-row seats 22. A distance between dividing wall 38 and second row seat 22 that may range between 16-20 inches may be used accommodate third-row seat 12 when it is in a folded position. To mount third-row seat 12 to the dividing wall 38, conventional mounting devices 40 like those used for first- and second-row seats 18 and 22 may be used.

Dividing wall 38 may accommodate a rear window 42 that may be deployed between an open and a closed position. To lower rear view window 42, vehicle 10 may be provided with a hand-actuated window or the window may be actuated automatically by a motor 44. Motor 44 may be powered by a separate battery (not shown) housed within an interior of dividing wall 38, or include an electrical connection (not shown) that couples the motor 44 to the vehicle 10's battery.

Bed 16 of vehicle 10 may include a recess 46 having dimensions that are sufficient to accommodate the dividing wall 38 and third-row seat 12 when third-row seat 12 is in a deployed position. Recess 46 may be enclosed by a cover 51 hingedly connected to bed 16 when seat 12 is in a stowed position. Cover 51 opens to allow seat 12 and dividing wall 38 to fit within recess 46. Referring to FIGS. 4-7, to deploy third-row seat 12, rear view window 34 mounted within dividing wall 38 is lowered (FIG. 4) either manually or automatically.

Figure 5:
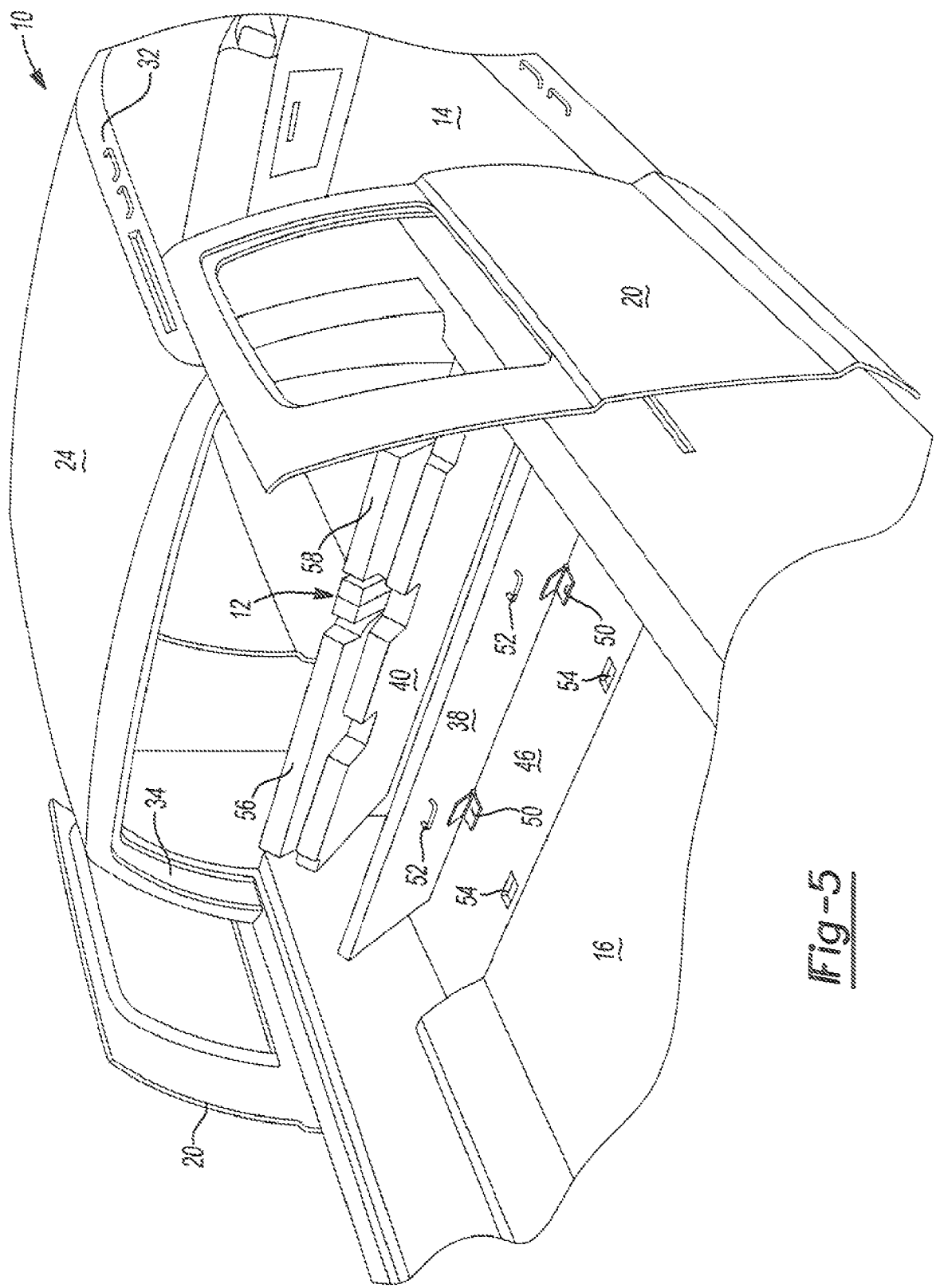
FIG. 5 is a perspective view illustrating a step of deploying a third row seat according to the present disclosure.
Figure 6:
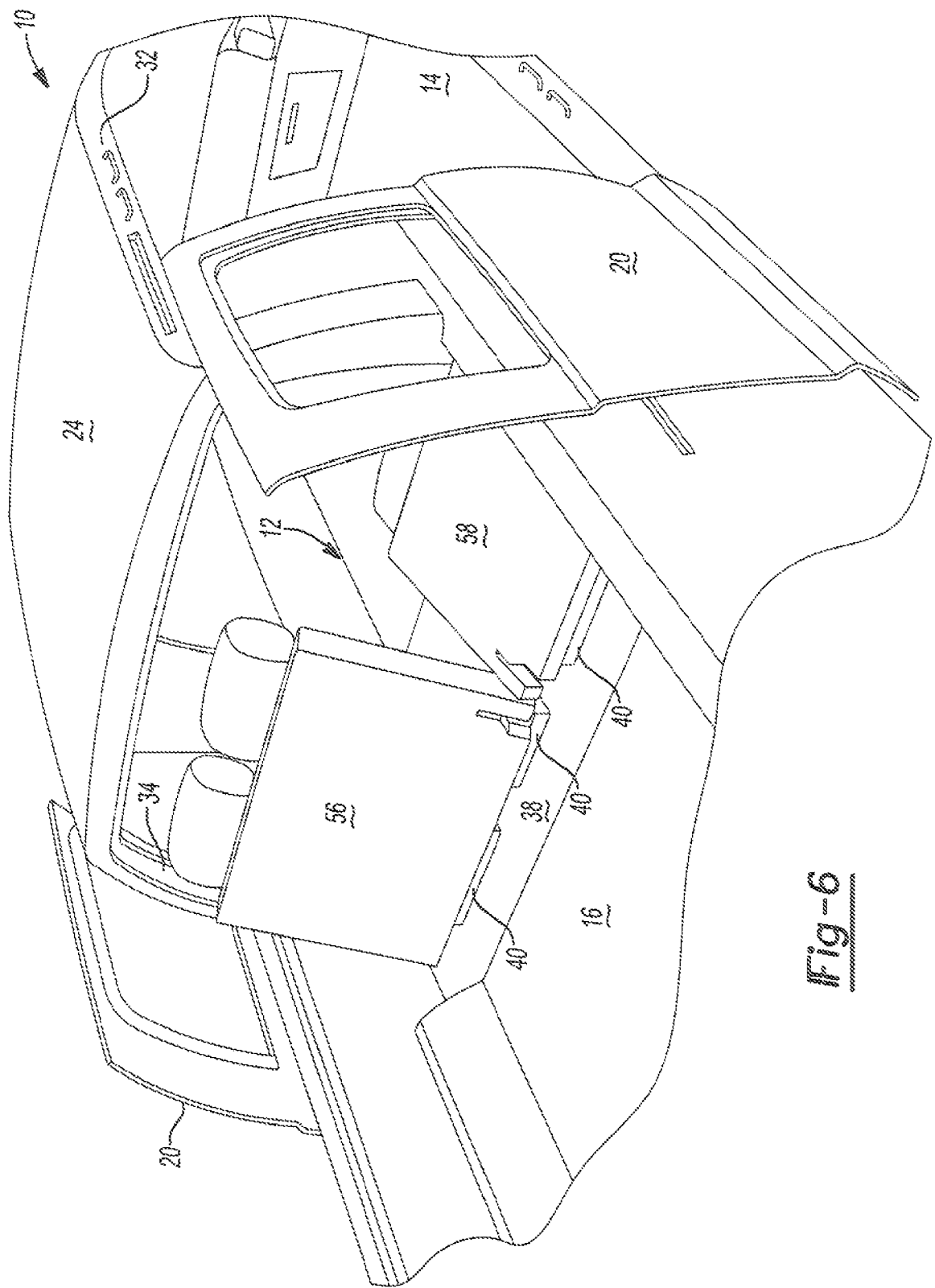
FIG. 6 is a perspective view illustrating a step of deploying a third row seat according to the present disclosure.

Once window 42 is fully lowered, dividing wall 38 and third-row seat 12 may rotate on pivot 48 towards recess 46 (FIG. 5). Dividing wall 38 may be manually actuated, or be additionally coupled to motor 44 that actuates window 42. Alternatively, dividing wall 38 may be actuated by a separate motor (not shown). Dividing wall 38 may be coupled to recess 46 of motor vehicle 10 through hinges 50 or pivot 48 that enables dividing wall 38 to pivot relative to recess 46.

To secure dividing wall 38 to recess 46, recess 46 or dividing wall 38 may be provided with locking mechanisms 52 and 54 that secure dividing wall 38 to recess 46. Locking mechanisms 52 and 54 prevent dividing wall 38 and third-row seat 12 from disengaging from recess 46. In this regard, locking mechanisms 52 and 54 may be comprised of a latch 54 and hook 52 similar to those used to secure conventional removable seats. Other locking mechanisms, however, are contemplated and the present disclosure should not be limited thereto.

Figure 7:
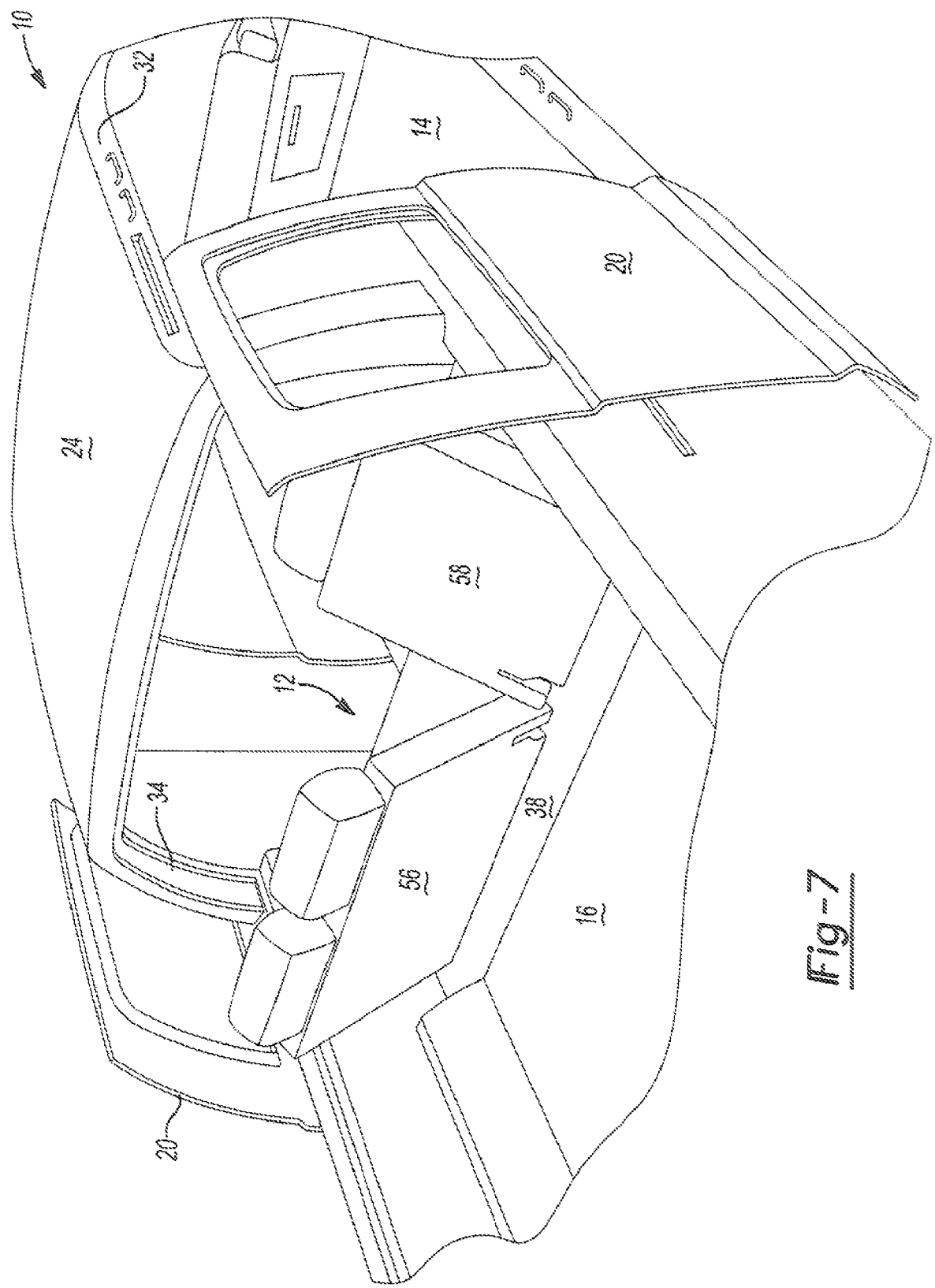
FIG. 7 is a perspective view illustrating a step of deploying a third row seat according to the present disclosure.

Once dividing wall 38 is secured to recess 46 (FIG. 6), third-row seat 12 may be rotated from a folded position to an upright position. Seat 12 may be divided into a plurality of seat backs 56 and 58 that may fold outward to an upright position as desired. In this regard, providing a plurality of seat backs 56 and 58 increases the functionality of third-row seat 12 in that when each of the seats 56 and 58 is not being used, one of the seatbacks may remain in a folded state to increase the cargo capacity of motor vehicle 10 (FIG. 7). Similar to actuation of dividing wall 38, third row seats 12 may be unfolded relative to dividing wall 38 manually or automatically. Accordingly, although third-row seats 12 are illustrated to deploy separately in the figures, it should be understood that each of the third-row seats 12 may deploy simultaneously.

Now referring to FIGS. 8 and 9, the third-row seat 12, in an un-deployed state, may be disposed in bed 16 of motor vehicle 10. As shown in FIG. 8, third-row seat 12 may be stowed within a secondary recess 47 formed adjacent recess 46. In this regard, third-row seat 12 may be folded in a manner such that when seat 12 is in a stowed position, seat 12 folds to fit neatly within secondary recess 47 of bed 16. When seat 12 is in the stowed position, seat 12 may be hidden in secondary recess 47 by a cover 49 that may be hingedly connected to bed 16.

Similar to the configurations shown in FIGS. 2 and 3, dividing wall 38 may accommodate a rear window 42 that may be deployed between an open and a closed position. To lower rear view window 42, vehicle 10 may be provided with a hand-actuated window or the window may be actuated automatically by a motor (see FIGS. 2 and 3). Motor 44 may be powered by a separate battery (not shown) housed within an interior of dividing wall 38, or include an electrical connection (not shown) that couples the motor 44 to the vehicle's battery. To deploy third-row seat 12, rear view window 34 mounted within dividing wall 38 may be lowered either manually or automatically.

Once window 42 is fully lowered, dividing wall 38 and third-row seat 12 may rotate on pivot 48 towards recess 46. Dividing wall 38 may be manually actuated, or be additionally coupled to motor 44 that actuates window 42. Alternatively, dividing wall 38 may be actuated by a separate motor (not shown). Dividing wall 38 may be coupled to recess 46 of motor vehicle 10 through hinges 50 or pivot 48 that enables dividing wall 38 to pivot relative to recess 46. See, for example, FIG. 4.

Figure 4:
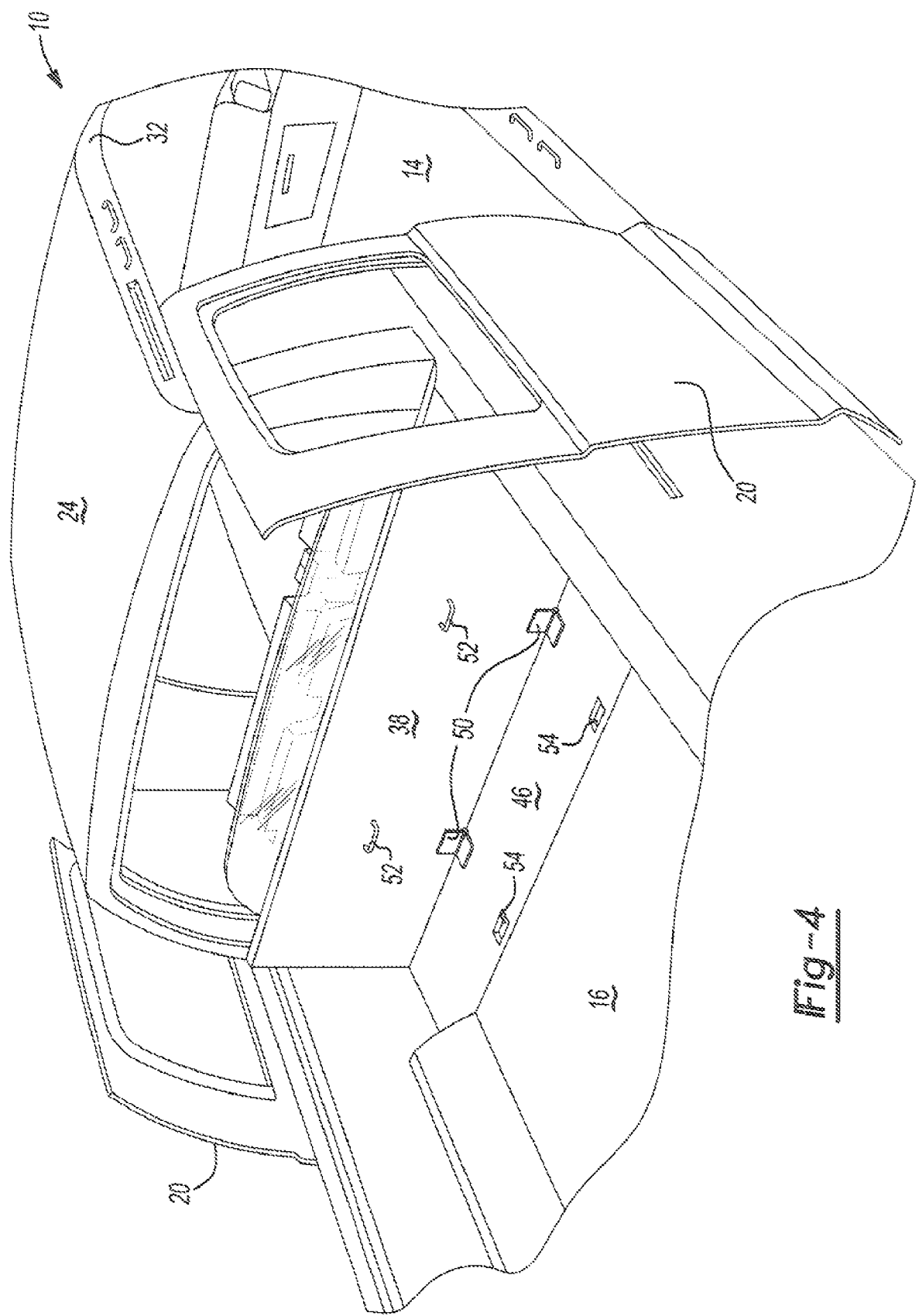
FIG. 4 is a perspective view illustrating a step of deploying a third row seat according to the present disclosure.

To secure dividing wall 38 to recess 46, recess 46 or dividing wall 38 may be provided with locking mechanisms 52 and 54 that secure dividing wall 38 to recess 46 like those shown in FIG. 4. Locking mechanisms 52 and 54 prevent dividing wall 38 and third-row seat 12 from disengaging from recess 46. In this regard, locking mechanisms 52 and 54 may be comprised of a latch 54 and hook 52 similar to those used to secure conventional removable seats. Other locking mechanisms, however, are contemplated and the present disclosure should not be limited thereto.

Once dividing wall 38 is secured to recess 46, third-row seat 12 may be rotated from the stowed position to a deployed position. Referring again to FIG. 9, seat 12 may be rotated from secondary recess 47 in a direction toward primary recess 46 to a position where seat 12 rests on dividing wall 38. To secure seat 12 to dividing wall 38, latches similar to those shown in FIG. 4 may be used. Once seat 12 is latched to dividing wall 38, cover 49 is shut to close secondary recess 47. It should be understood that once dividing wall 38 is secured to recess 46, third-row seat 12 is not required to deploy. In this regard, however, it should further be noted that second row seats 22 may be capable of folding to a downward position. Such a feature may increase the functionality of vehicle 10 in that cargo bed 16 may be extended into cabin 14 when dividing wall 38 is secured to recess 46 and second row seats 22 are folded down.

Figure 10:
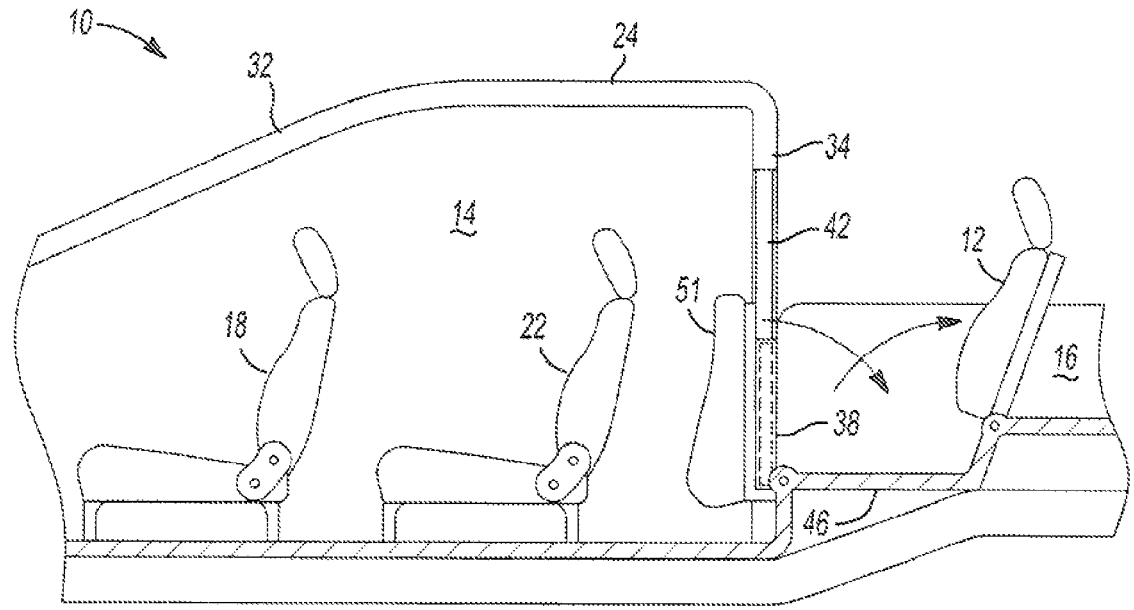
FIG. 10 is a cross-sectional view of a motor vehicle including a third row seat according to the present disclosure in an un-deployed state.
Figure 11:
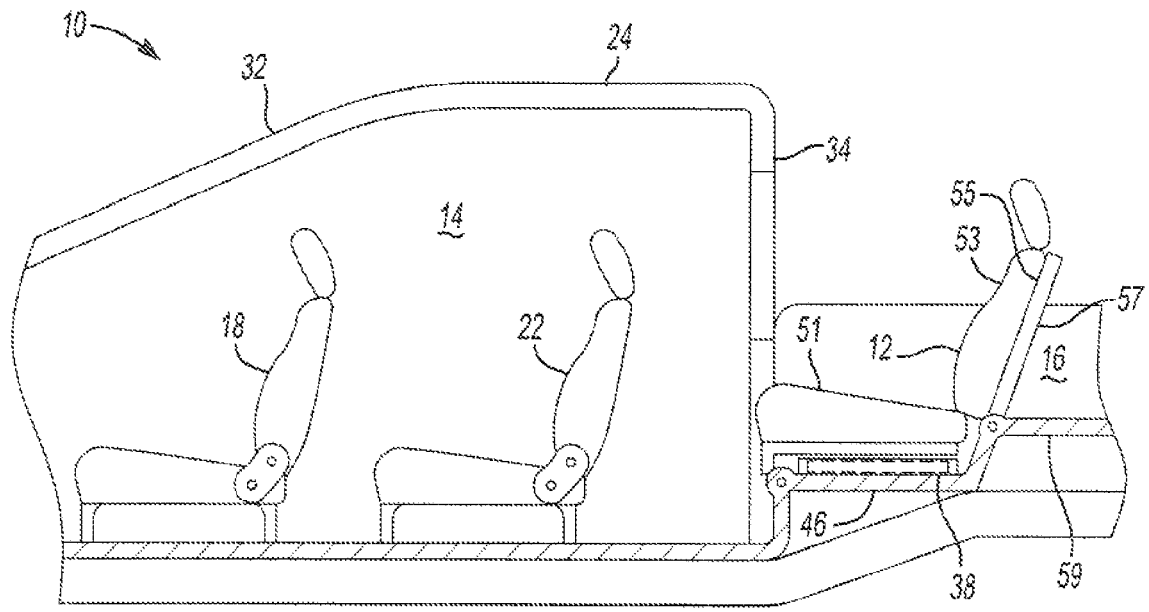
FIG. 11 is a cross-sectional view of a motor vehicle including a third row seat according to the present disclosure in a deployed state.

Now referring to FIGS. 10 and 11, a bottom seat cushion 51 of third-row seat 12, in an un-deployed state, may be disposed in cabin 14 of motor vehicle 10. Bottom seat cushion 51 may be mounted to dividing wall 38 that separates cabin 14 from bed 16 of motor vehicle 10. In this regard, bottom seat cushion 51 may be secured to dividing wall 38 in a manner such that when seat 12 is in a stowed position (i.e., when dividing wall 38 is in an upright position), bottom seat cushion 51 fits neatly behind second-row seats 22. A distance between dividing wall 38 and second seat 22 that may range between 1 and 5 inches may be used accommodate bottom seat cushion 51 when dividing wall 38 is in an upright position. To mount bottom seat cushion 51 to the dividing wall 38, conventional mounting devices (not shown) similar to mounting devices 40 shown in FIGS. 2 and 3 may be used.

As illustrated in FIGS. 10 and 11, bed 16 of vehicle 10 may include recess 46. Recess 46, however, as shown in FIG. 10, may be designed to accommodate a rear cushion 53 of third-row seat 12 when dividing wall 38 is an upright position. Accordingly, recess 46 may have dimensions that are sufficient to accommodate rear cushion 53 when third-row seat 12 is in a non-deployed position. Rear cushion 53 may be mounted to an underside 55 of a cover 57 that is hingedly mounted to recess 46. Cover 57 forms an essentially coplanar surface with a floor 59 of bed 16 when rear cushion 53 is in a stowed position.

To deploy third-row seat 12, window 42 mounted within dividing wall 38 is lowered (See e.g., FIG. 4) either manually or automatically. Prior to window 42 being lowered, rear cushion 53 and cover 57 may be unfolded from recess 46. After rear cushion 53 is unfolded from recess 46, dividing wall 38 and bottom seat cushion 51 may rotate on pivot 48 towards recess 46 (See e.g., FIG. 5). Similar to the configurations illustrated in FIGS. 2 and 3, dividing wall 38 may be manually actuated, or be additionally coupled to motor that actuates window (see FIGS. 2 and 3). Alternatively, dividing wall 38 may be actuated by a separate motor (not shown). Dividing wall 38 may be coupled to recess 46 of motor vehicle 10 through hinges 50 or pivot 48 that enables dividing wall 38 to pivot relative to recess 46 (see FIG. 4).

To secure dividing wall 38 to recess 46, recess 46 or dividing wall 38 may be provided with locking mechanisms 52 and 54 that secure dividing wall 38 to recess 46 like those shown in FIG. 4. Locking mechanisms 52 and 54 prevent dividing wall 38 and third-row seat 12 from disengaging from recess 46. In this regard, locking mechanisms 52 and 54 may be comprised of a latch 54 and hook 52 similar to those used to secure conventional removable seats. Other locking mechanisms, however, are contemplated and the present disclosure should not be limited thereto. Once dividing wall 38 is secured to recess 46, third-row seat 12 is in a fully deployed position.

As may be required by vehicle 10 safety regulations, vehicle 10 may be provided with a removable roll bar 75 when third row seats 12 are in a deployed position (see FIG. 1). Roll bar 75 may be a foldable device that may be stowed beneath second row seats 22 when third-row seats 12 are not in use. Third-row seats 12 may also include a restraint system 60. In this regard, restraint system 60 may be lap belts (not shown) integrated with third-row seat 12. Alternatively, as illustrated in FIGS. 12 and 13, restraint system may include shoulder belts 61 that are coupled to bed 16.

Figure 12:
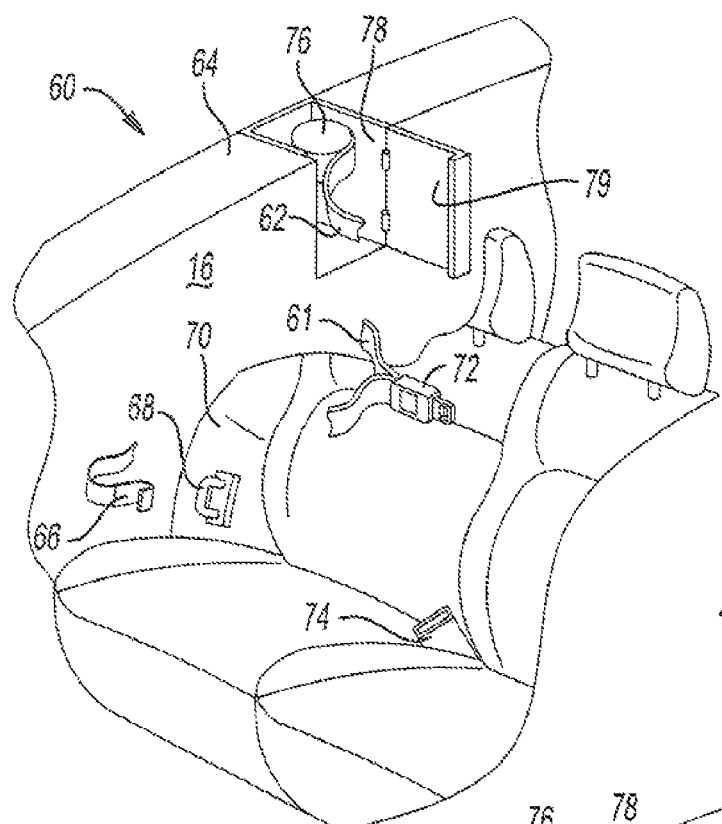
FIG. 12 is a perspective view of a safety belt that may be used with a third row seat according to the present disclosure.
Figure 13:
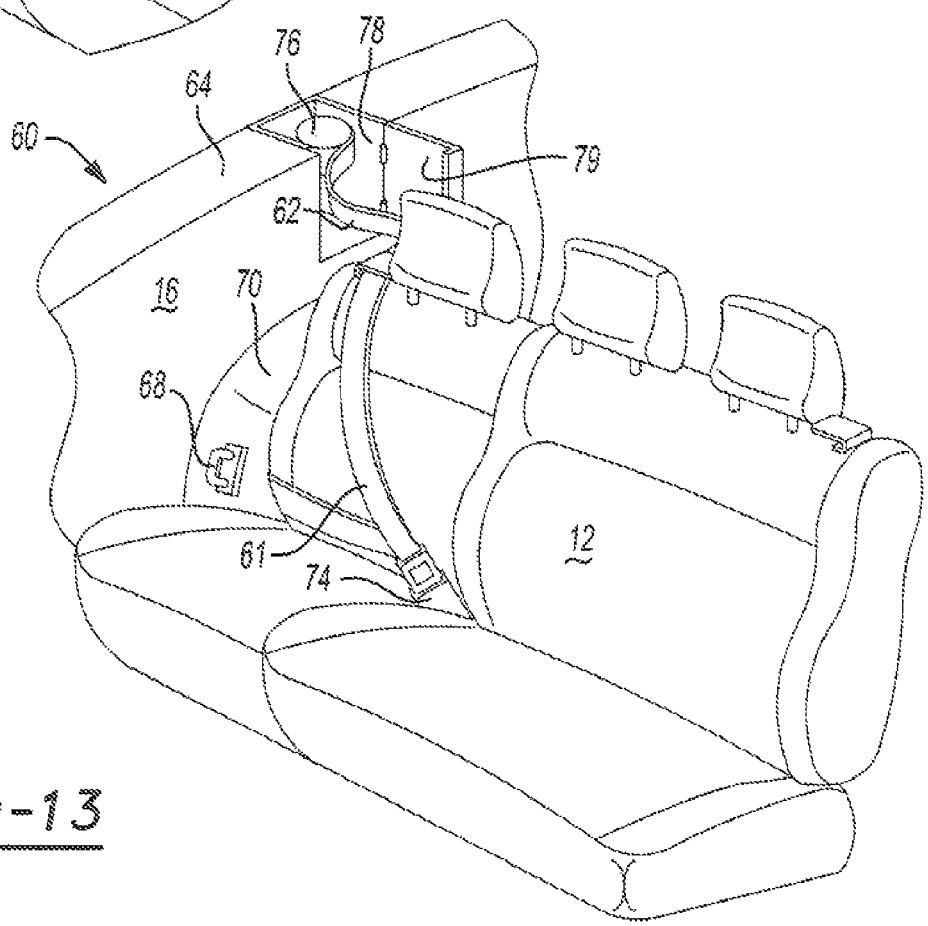
FIG. 13 is a perspective view of a safety belt with a third row seat according to the present disclosure.

Referring to FIGS. 12 and 13, restraint system 60 may be disposed within a housing 78 formed in bed 16. To reach restraint system 60, housing 78 may be provided with a door 79 that may be opened to expose restraint system 60. Restraint system 60 may include a shoulder belt 61 having a first end 62 secured to an upper or inner surface 64 of bed 16 within housing 78, while a second end 66 of shoulder belt 61 may be connected to a hook 68 formed on a wheel-well or other surface 70 of cargo bed 16. A third end 72 of shoulder belt 61 may include a latch that may be secured to a coupling 74 that secures the passenger in third-row seat 12.

First end 62 of shoulder belt 61 may be wound around a spool 76 that enables shoulder belt 61 to adjusted to a plurality of lengths such that a passenger may merely pull on third end 72 to extend shoulder belt 61 to a length sufficient to secure third end 72 to coupling 74, as is known in the art. To hide shoulder belt 61 when third-row seat 12 is not deployed, housing door 79 is simply closed to seal housing 78 with restraint system 60 therein.

Figure 14:
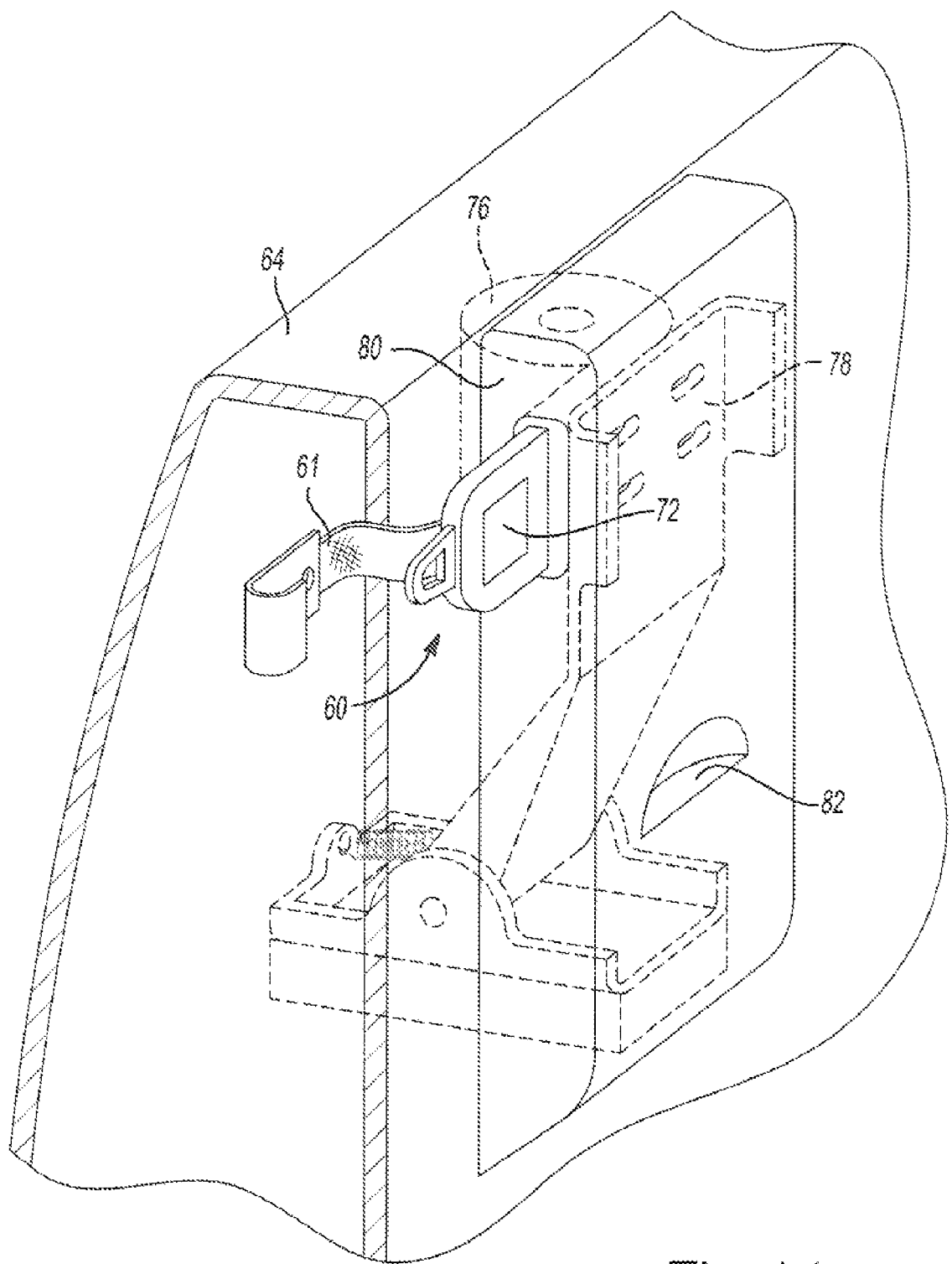
FIG. 14 is a perspective view of a safety belt housing that may be used with a third row seat according to the present disclosure.
Figure 15:
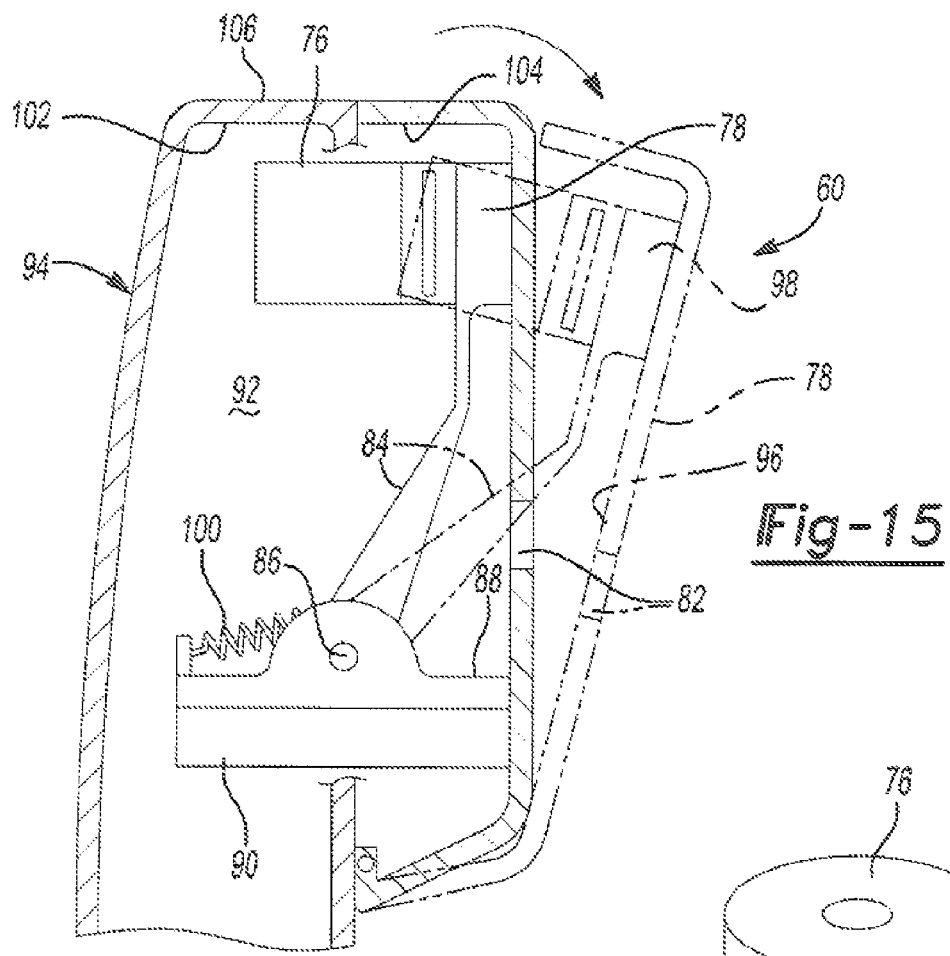
FIG. 15 is a cross-sectional view of a safety belt disposed within a safety belt housing that may be used with a third row seat according to the present disclosure.
Figure 16:
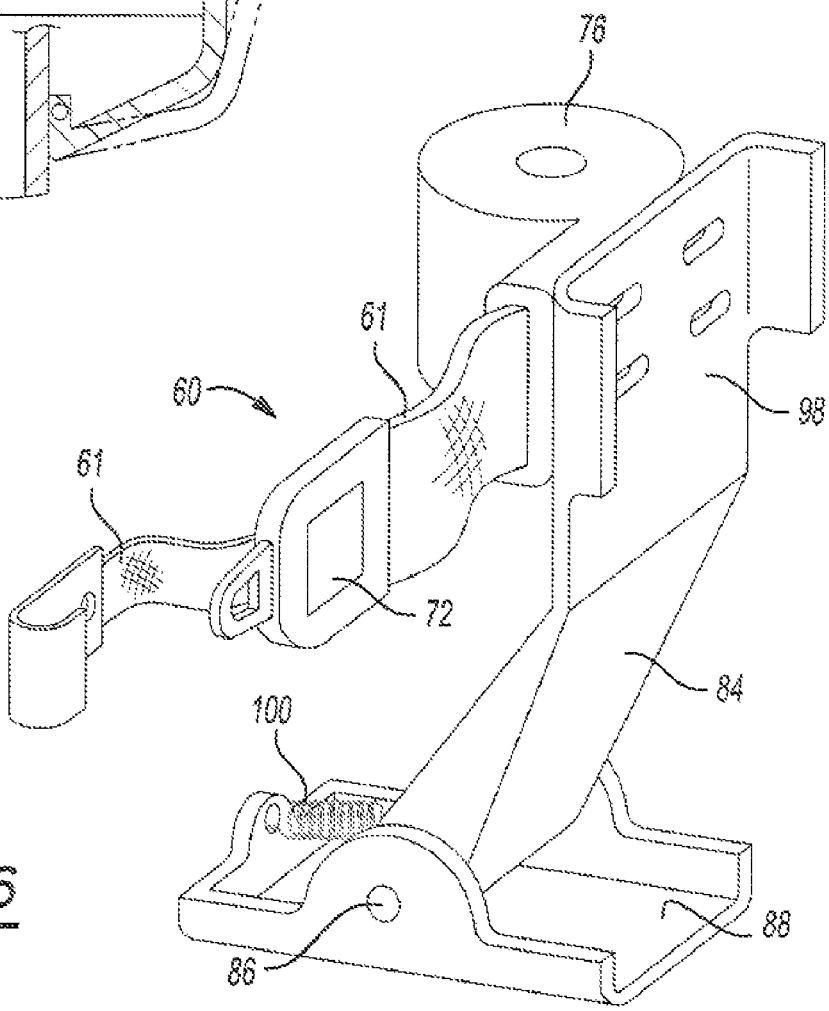
FIG. 16 is a perspective view of a safety belt that may be disposed within a safety belt housing that may be used with a third row seat according to the present disclosure.

Now referring to FIGS. 14-16, restraint system 60 may be disposed within a movable housing 81 that may include a slot or passage 80 that enables shoulder belt 61 to be pulled therefrom. As illustrated in FIG. 15, housing 78 may be actuatable between a position that may be generally co-planar with surface 64 of bed 16 and a position that extends outward relative to surface 64. To actuate housing 78 outward from surface 64, housing 78 may be provided with a handle 82 that enables a passenger to pull housing 78 to the outward position.

Shoulder belt 61 may be mounted within housing 78 by a support arm 84. Support arm 84 may be rotatably mounted at a hinge 86 to a bracket 88 that may be secured to a surface 90 within an interior 92 of a wall 94 of bed 16. To ensure that support arm 84 rotates when housing 78 is actuated outward relative to surface 64, support arm 84 may also be attached to an inner surface 96 of housing 78 by a connection bracket 98. To bias housing 78 and shoulder belt 61 to a closed position, a spring 100 may used to couple support arm 84 to bracket 88. To open housing 78 to gain access to restraint system 60, a passenger may simply pull handle 82 with sufficient force to overcome the force exerted by spring 100. Then, the passenger may pull on shoulder belt 61 to remove belt 61 from slot 80.

The description is merely exemplary in nature and, thus, variations that do not depart from the gist of the present disclosure are intended to be within its scope. Such variations are not to be regarded as a departure from the spirit and scope of the present disclosure.

What is claimed is:

1. A vehicle including a cabin and a bed, said vehicle comprising:
    a first-row seat and a second-row seat provided in the cabin;
    a dividing wall separating the cabin and the bed; and
    a third-row seat mounted to said dividing wall,
    wherein said dividing wall is pivotable to deploy said third-row seat from a stowed to an un-stowed position.

2. The vehicle of claim 1, wherein said dividing wall pivots into the bed from the cabin.

3. The vehicle of claim 1, further comprising a sliding door that provides access to said seat.

4. The vehicle of claim 1, further comprising a recess formed in the bed, said recess accommodating said dividing wall when said seat is in a deployed position.

5. The vehicle of claim 4, wherein said dividing wall includes a locking mechanism that secures said dividing wall to said recess.

6. The vehicle of claim 1, further comprising a restraint system for said seat integrated into the bed.

7. The vehicle of claim 6, wherein said restraint system includes a safety belt mounted within a housing formed in the bed.

8. A vehicle including a cabin and a bed, the vehicle comprising:
    a first row seat and a second row seat provided in the cabin;
    a pivotable dividing wall separating the cabin and the bed; and
    a third-row seat actuatable between a stowed position and an unstowed position.

9. The vehicle of claim 8, wherein said third-row seat is mounted to said dividing wall.

10. The vehicle of claim 9, wherein said dividing wall pivots into the bed to deploy said third-row seat to said unstowed position.

11. The vehicle of claim 8, wherein said third-row seat is disposed in a recess of the bed in said stowed position and is rotatable to said unstowed position.

12. The vehicle of claim 11, wherein said dividing wall pivots into the bed and said third-row seat rests on said dividing wall when said third-row seat is in said unstowed position.

13. The vehicle of claim 8, wherein a bottom seat cushion of said third-row seat is mounted to said dividing wall and a rear seat cushion is mounted to a recess formed in the bed.

14. The vehicle of claim 13, wherein said rear seat cushion is rotatable relative to said recess to place said rear seat cushion in an upright position, and said dividing wall and said bottom seat cushion pivots into the bed to deploy said third-row seat to said unstowed position.

15. The vehicle of claim 8, further comprising a first door that provides access to said first row seat, and a second door that provides access to said second- and third-row seat, said second door being slidable relative to a body of the vehicle.

16. The vehicle of claim 8, further comprising a restraint system for said third-row seat integrated into the bed.

17. The vehicle of claim 16, wherein said restraint system for said third-row seat includes a safety belt disposed within a housing formed in the bed.

18. The vehicle of claim 17, wherein said housing is actuatable between a closed and an extended position relative to a wall of the bed.

19. A vehicle having a cabin and a bed, comprising:
 a first-row seat and a second-row seat mounted in the cabin;
 a dividing wall separating the cabin and the bed;
 a third-row seat mounted to said dividing wall, said dividing wall pivotable to deploy said third-row seat from a stowed to an un-stowed position; and
 a restraint system integral with the bed for said third-row seat.

* * * * *

UNITED STATES PATENT AND TRADEMARK OFFICE
CERTIFICATE OF CORRECTION

| | | |
|---|---|---|
| PATENT NO. | : 7,762,621 B2 | Page 1 of 1 |
| APPLICATION NO. | : 11/763706 | |
| DATED | : July 27, 2010 | |
| INVENTOR(S) | : Duller | |

It is certified that error appears in the above-identified patent and that said Letters Patent is hereby corrected as shown below:

Cover Page:

Item (73) Assignee:    Chrysler Group LLP, Auburn Hills, MI (US)

*Should be:*

*Chrysler Group LLC, Auburn Hills, MI (US)*

Signed and Sealed this

Seventh Day of September, 2010

David J. Kappos
*Director of the United States Patent and Trademark Office*